July 29, 1969 H. D. DAIGH 3,457,906
CONTROL MECHANISM FOR EXHAUST RECYCLE SYSTEM
Filed Aug. 7, 1967 4 Sheets-Sheet 1

INVENTOR.
HAROLD D. DAIGH
BY David S. Reisdorf
ATTORNEY.

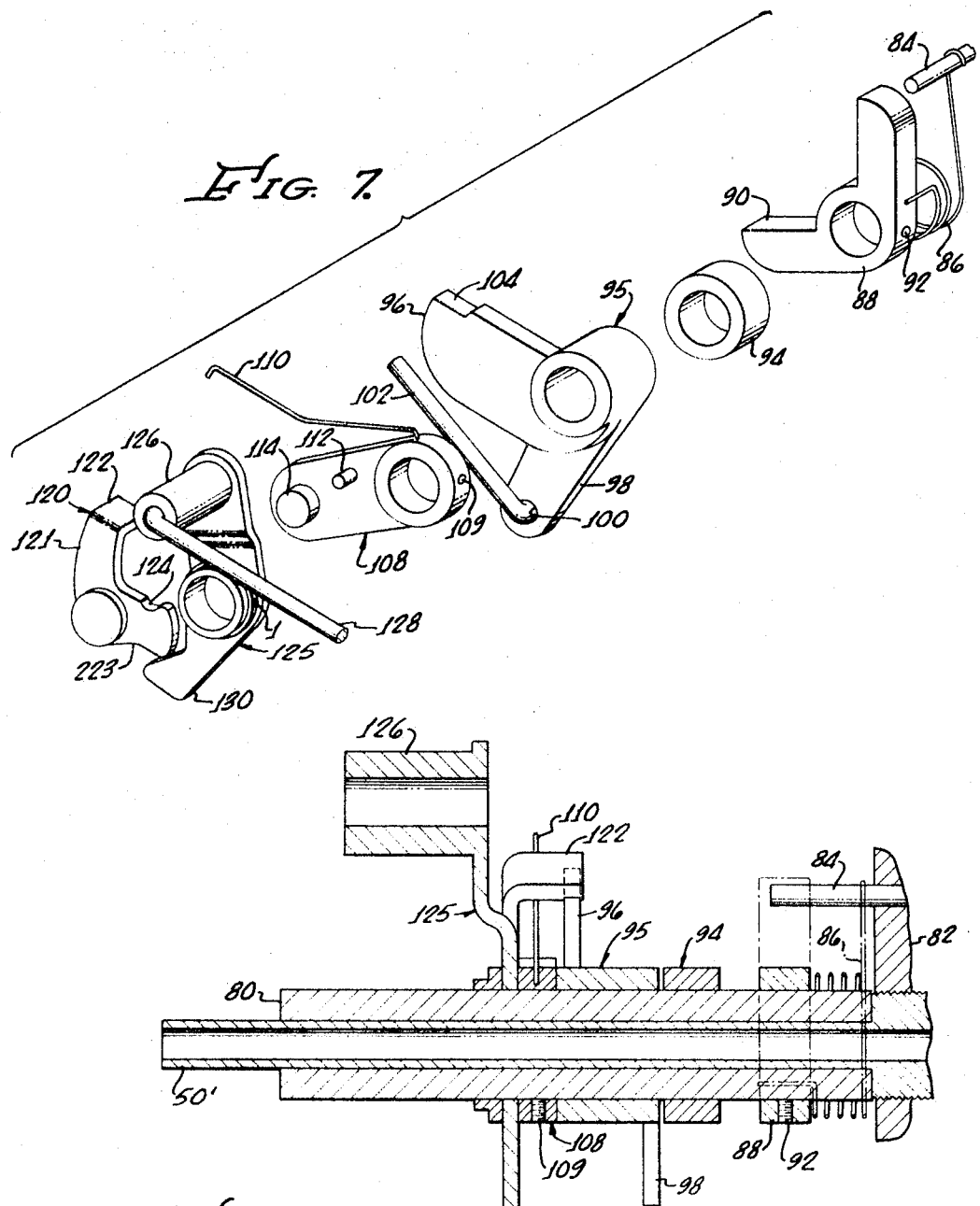

INVENTOR
HAROLD D. DAIGH
BY
Donald W Canady
ATTORNEY.

United States Patent Office 3,457,906
Patented July 29, 1969

3,457,906
CONTROL MECHANISM FOR EXHAUST
RECYCLE SYSTEM
Harold D. Daigh, Rolling Hills, Calif., assignor to Atlantic Richfield Company, Philadelphia, Pa., a corporation of Pennsylvania
Filed Aug. 7, 1967, Ser. No. 658,903
Int. Cl. F02m 7/00; F02b 33/44
U.S. Cl. 123—119      8 Claims

ABSTRACT OF THE DISCLOSURE

A control mechanism for overriding exhaust recycle systems used with internal combustion engine vehicles. The drive means for the recycle control valve is overriden, thereby preventing recycling of exhaust gases if a sensed temperature corresponding to that of the engine, such as the induction system temperature, is below a predetermined level. In one embodiment, the control mechanism comprises a choke actuated stop member which overrides a resilient drive connection between the recycle valve and the throttle valve. In another embodiment, the control mechanism comprises a mechanical clutch-like device which disengages the recycle valve from its operative connection to the throttle valve when a sensed temperature corresponding to the engine temperature is below a predetermined level.

Background of the invention

Internal combustion engine driven vehicles equipped with exhaust recycle systems such as that disclosed in my Patent No. 3,237,615 sometimes exhibit poor starting characteristics in very cold weather due to a dilution of the fuel mixture by recycled gases and intake of cool air from the heat riser channel through the recycle system during starting. The exhaust recycle valve of such systems is normally operated conjointly with the accelerator floor pedal of the automobile. Thus, as the floor pedal is depressed for starting, the exhaust recycle valve is opened permitting a large amount of cool air to circulate into the recycle manifold of the automobile.

Summary of invention

This invention is basically an improvement on prior art exhaust recycle systems to correct the occasionally experienced cold weather starting difficulties. This improvement comprises the inclusion of an overriding thermally activated control mechanism in the exhaust recycle system for preventing recirculation of exhaust vapors at low temperatures. The mechanism includes a member for sensing the temperature of the engine or its related components which vary in temperature in correspondence with the engine temperature. This is accomplished in one embodiment by the use of a valve comprising a bimetallic thermally expansible strip mounted in the induction manifold at the inlet portion of the exhaust recycle line in the heat riser. When the temperature of the vapors in the heat riser is below a predetermined minimum, the bimetallic strip seats tightly against the exhaust recycle inlet preventing recycle of the cool air in the heat riser. As the temperature in the heat riser increases, the thermal valve unseats from the inlet to the recycle conduit permitting recycle of exhaust gases to occur in accordance with the design of the system. Other embodiments of the thermal control of this invention operate to prevent the recycle valve from opening if the temperature of the air in the heat riser is below a predetermined minimum or in correspondence with the choke valve position.

One object of this invention is to provide a thermal control device for an exhaust recycle mechanism which prevents recycling of exhaust gases into the combustion chambers of an internal combustion engine when the engine temperature is below a predetermined level.

Still another object of this invention is to provide an exhaust recycle system for an internal combustion engine wherein cool gases are not recycled to the engine combustion chambers during start up in cold weather.

These and other objects of this invention will become more apparent from consideration of the following description and appended claims when taken in conjunction with the drawings wherein:

FIG. 6 is a sectional view showing another embodiment of the recycle valve control mechanism mounted on the recycle valve shaft;

FIG. 7 is an exploded view of the recycle valve control mechanism of FIG. 6;

Figure 1:
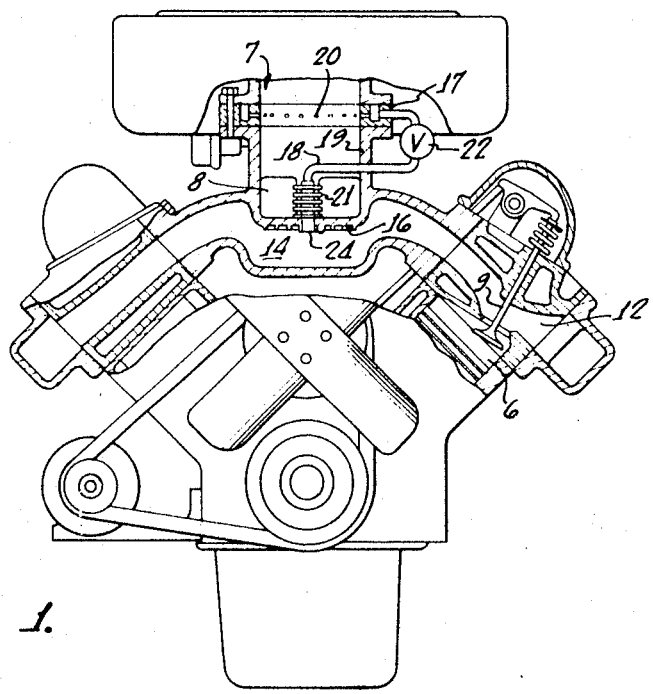
FIG. 1 is a front elevation, partially in section, of an internal combustion engine showing the path of exhaust gases through the heat riser.

Referring to the drawings, FIG. 1 is a cross-section through a conventional V–8 internal combustion engine showing one of the combustion chambers 6, a carburetor 7, and an induction system 8. Exhaust gas is discharged into the exhaust manifold 12 and the heat riser channel 14 from chamber 6 when exhaust valve 9 is opened during the exhaust cycle. A conventional heat riser passageway or channel 14 conveys a portion of the exhaust gas from one or more of the exhaust outlets to preheat or vaporize the air-fuel mixture passing through the induction system into the intake manifold by heat exchange through a hot plate 16.

Figure 3:
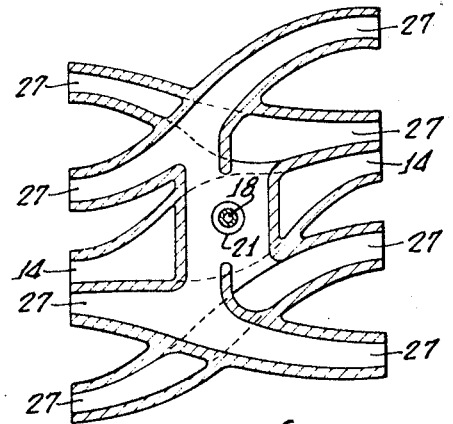
FIG. 3 is a plan view in section, taken substantially through the intake manifold of FIGURE 1.

The hot plate section of the conventional heat riser is used to heat and vaporize the air-fuel mixture coming from the carburetor prior to its passage into the combustion chamber through the intake manifold. The hot recycled exhaust gas may also be used to heat and vaporize the air-fuel mixture within the intake manifold while cooling the exhaust gas prior to its injection into the induction system. While the total heat content of the charge is not altered within the confines of the induction system, the fact that the exhaust recycle portion of the charge is cooled somewhat is beneficial in reducing nitrogen oxides from the exhaust. If the exhaust recycle gas is too cool, however, poor starting characteristics may be observed. FIG. 3 shows that the heat riser channel 14 extends to the hot plate 16 from both cylinder banks of the engine.

A conduit 18 having cooling fins 21 passes through hot plate 16, as best shown in FIG. 1, to recycle a portion of the gas passing through the heat riser into induction system 8 through a recycle manifold 17 and circumferentially spaced openings 20. Conduit 18 passes through the intake manifold 19 as shown and is contacted by the cooler incoming air-fuel mixture to thereby effect a heat exchange therewith thus resulting in cooling of the recycled exhaust gas. Conduit 18 passes into the upper end of the intake manifold 19 just below carburetor 7 so that exhaust gas recycled through conduit 18 combines with the air-fuel mixture passing from the carburetor through the intake manifold 19 into combustion chambers through intake ports 27 (see FIG. 3). With the recycle entering the charge downstream from the carburetor, manifold vacuum may be utilized to draw recycle gas from heat riser 14 through conduit 18.

A valve 22 is positioned within conduit 18 and may be connected to a foot throttle, not shown, of an internal combustion engine driven vehicle to control the amount of exhaust gas that is recycled into the intake manifold. Preferably valve 22 is so coupled to the foot throttle that at idle throttle position the valve is substantially closed so that very little or substantially no exhaust gas is recycled into the engine through the intake manifold. As the carburetor throttle valve is opened to increase the speed of the engine, valve 22 gradually opens to recycle a proportionately larger amount of exhaust gas into the engine until at wide-open throttle where the volume of exhaust gas is greatest, a controlled maximum amount of exhaust gas is recycled into the combustion chambers through the intake manifold 8. At floorboard position of the foot pedal where full power is desired for passing or rapid acceleration, valve 22 closes so that substantially no exhaust gas is recycled into the engine. By preventing the recycle of exhaust gas into the engine at floorboard position, the air-fuel mixture is effectively enriched so that full power is attained when needed. The effect of the amount of exhaust gas recycled into the engine on the reduction of nitrogen oxide in the exhaust gas in such a recycle system is discussed in my aforementioned U.S. Patent No. 3,237,615.

Figure 2:
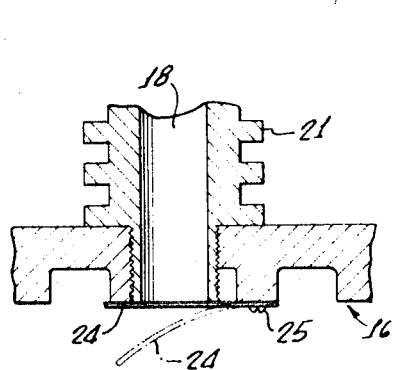
FIG. 2 is an enlarged view of the recycle conduit inlet and thermal valve therefor.

The valve-type control mechanism of this invention for overriding exhaust recycle valve 22 comprises a flexible, bimetallic, thermally responsive strip member 24, fixedly attached by one end to hot plate 16, as by welding one end of strip 24 to the hot plate or by means of a set screw 25. The other end of strip member 24 extends toward the open end of conduit 18 and is movable between the positions shown in solid and dashed lines in FIG. 2. When the temperature of the exhaust gases in the heat riser channel is above a predetermined level, strip member 24 is in the open or non-sealing position as shown by the dashed line of FIG. 2. When the temperature of the gases in heat riser channel 14 is below a predetermined level, however, the uneven contraction of the metals in bimetallic strip member 24 causes the free end of strip 24 to move into sealing relationship with the lower end of conduit 18, as shown by the solid lines in FIG. 2, to prevent exhaust gases from flowing into the conduit from heat riser channel 14. Preferably, the bimetallic strip is mounted on hot plate 16 so that its free end remains in sealing relationship with conduit 18, as shown in FIG. 2, until the temperature of the air-exhaust gas mixture surrounding strip 24 in heat riser channel 14 reaches about 300° F. At 500° F. strip 24 is preferably fully opened so that maximum recycle of exhaust gas is obtained.

The embodiment of the control mechanism shown in FIGS. 4 and 5 prevents the exhaust recycle valve from opening when the sensed temperature is below a predetermined level. This control mechanism, in contrast with the valve type control of FIGS. 1 and 2, disables operation of the exhaust recycle valve.

Figure 4:
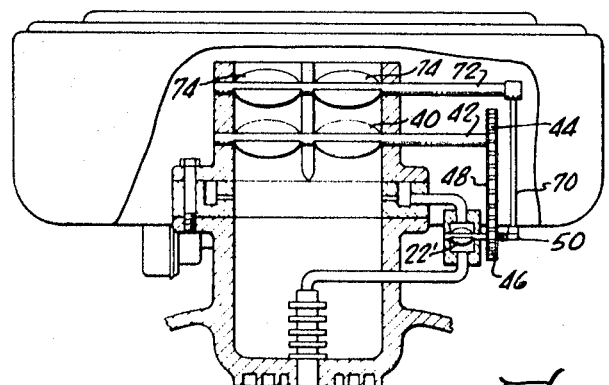
FIG. 4 shows in partial section another embodiment of the thermal control means for the recycle system of this invention.

FIG. 4 shows an exhaust recycle valve 22' operatively connected to the carburetor throttle valve 40 by means of a throttle shaft 42, a throttle activating sprocket wheel 44 which is nonrotatably mounted on shaft 42, a drive chain 48, and a recycle valve sprocket wheel 46 connected to a recycle valve shaft 50 by means of a helical tension spring 54. Recycle valve shaft 50 carries a fixedly mounted, radially extending plate 52 at its outwardmost end. The recycle valve sprocket wheel 46 is smaller in diameter than throttle activating sprocket wheel 44. By proportionally dimensioning sprocket wheels 44 and 46, recycle valve 22' is made to open as the carburetor throttle valve is opened. Since the ratio of the diameters of throttle activating sprocket wheel 44 to recycle valve sprocket wheel 46 is greater than 1:1, the recycle valve is fully open prior to wide open throttle position and closing as wide open throttle position approaches. At full throttle position, recycle valve 22' is again closed so that maximum power can be obtained without exhaust recycle. Thus, exhaust recycle is permitted at part-throttle position of the accelerator mechanism up to (but not including) wide open throttle.

With continued reference to FIGS. 4 and 5, the thermally responsive control mechanism for preventing recycling of exhaust gases when the temperature is below a predetermined level comprises an L-shaped, rigid stop member 70 fixedly mounted on the choke valve shaft for movement into and out of contact with plate 52 on exhaust recycle gear shaft 50. Stop member 70 is connected mechanically to the choke butterfly valve shaft 72 for activation in correspondence with the choke butterfly 74. As the choke setting changes due to variation in temperature in automatic chokes, shaft 72 rotates about its axis and causes stop member 70 to come into contact with plate 52 on shaft 50 of sprocket wheel 46. Sprocket wheel 46 is mounted on shaft 50 by means of helical spring 54 axially disposed about shaft 50 and having one end thereof fixedly mounted to the shaft and the other end fixedly mounted to a surface of sprocket wheel 46, as shown in FIG. 5. Spring 54 is of sufficient strength so that it normally rotates shaft 50 with sprocket wheel 46 to complete the operative connection between throttle valve 40 and recycle valve 22'. If rotation of shaft 50 is blocked, however, spring 54 tightens on the shaft so that sprocket wheel 46 can rotate independently for almost one entire revolution even though the shaft itself is held in a fixed position. Thus, as long as stop member 70 blocks the rotation of plate 52 recycle valve 22' is effectively disengaged from its linkage with throttle valve 40 so that rotation of sprocket wheel 46 by means of chain 48 and sprocket wheel 44 does not cause rotation of shaft 50 and opening of valve 22' when the choke is closed.

When the choke valve opens, stop member 70 is moved out of contact with plate 52 permitting rotation of shaft 50 and opening of valve 22'. The resilience of spring 54 returns shaft 50 immediately to the position it would have been in if stop member 70 had not interfered with its rotation. Thus, at low temperatures no recycling of the exhaust gas is permitted, but at temperatures above the level at which the choke is opened, stop member 70 moves out of blocking relation with plate 52 and the exhaust recycle valve immediately opens enabling recycling of exhaust gases through the induction manifold. The control mechanism prevents recycling of cold exhaust gases through the induction manifold and enhances the starting characteristics of internal combustion engines containing the exhaust recycle system shown.

Figure 5:
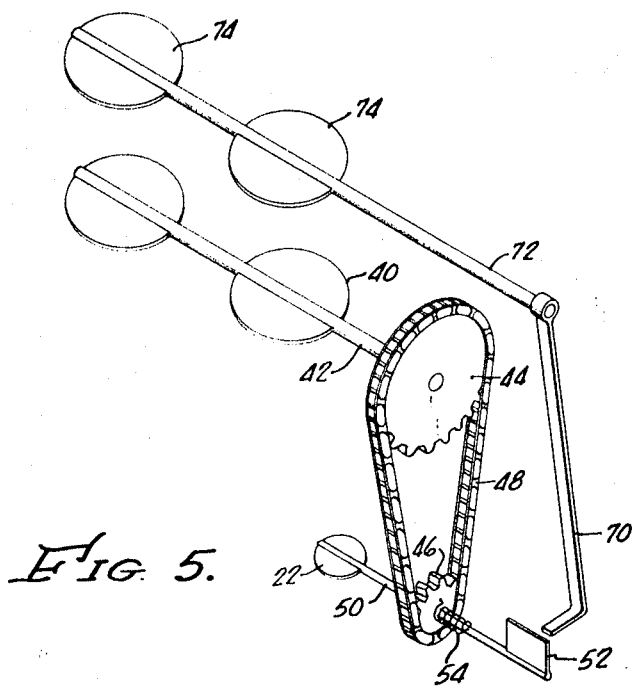
FIG. 5 is an isometric view of the recycle system drive train, showing the recycle valve, the throttle valve and the choke valve and the embodiment of FIG. 4 showing the control mechanism of this invention.
Figure 8:
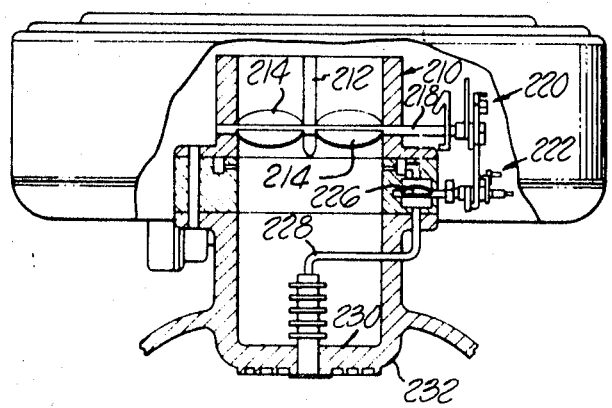
FIG. 8 is a front elevation, partially in section, showing a portion of the induction system of an internal combustion engine incorporating the embodiment of FIG. 6.
Figure 9:
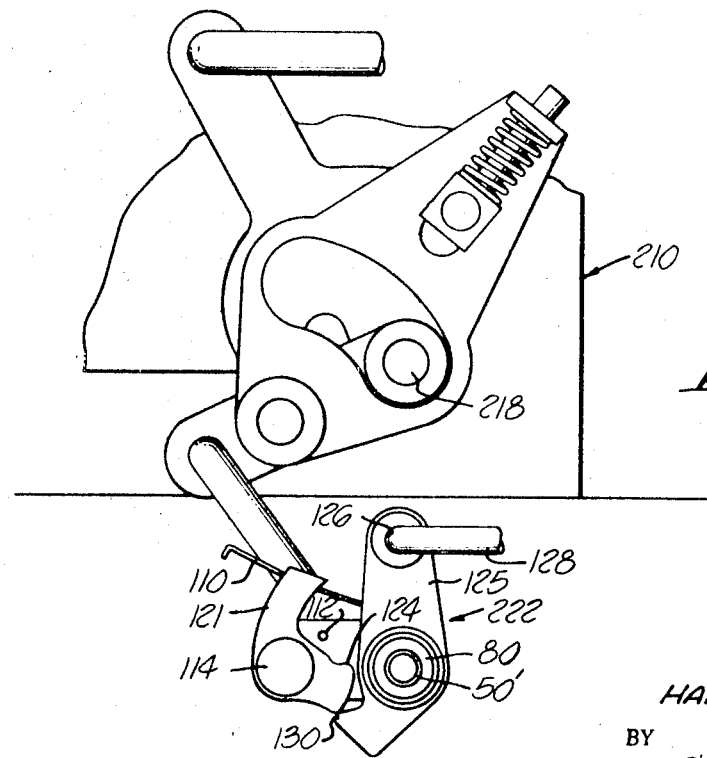
FIG. 9 is an enlarged side elevation of the recycle valve mechanism shown in FIG. 8.

With reference now to FIGS. 6 and 7, a recycle valve control mechanism clutch arrangement is shown which may be used in the place of that of FIG. 5. FIG. 8 shows a carburetor 210 with double barrels 212 and conventional throttle valves 214 mounted on a throttle shaft 218. At the outer extremity of shaft 218 is mounted a throttle activating linkage 220 which operatively connects the vehicle accelerator pedal (not shown) to the throttle valve shaft. This throttle activating mechanism adapted for conjoint operation with the recycle valve is more fully described in copending application Ser. No. 673,843, Daigh et al., filed Oct. 9, 1967. The device 220 is also operatively connected to the thermally activated recycle valve clutch mechanism 222 (shown in detail in FIGS. 6 and 7) mounted on a recycle valve shaft for controlling the position of recycle valve 226. Exhaust recycle valve 226 is pivotally mounted in a recycle conduit 228 leading from a heat riser 230 and is in fluid communication with heat riser channel 232 and the exhaust manifold as shown in my U.S. Patent No. 3,237,615. FIG. 9 shows an enlarged side view of the throttle and recycle valve mechanism of FIG. 8. The mechanism of FIG. 6 operates by means of a direct linkage to the throttle lever rather than through a sprocket wheel and chain arrangement as shown in FIG. 5. A hollow recycle valve shaft 50' is press fitted with a sleeve 80 for rotational movement therewith. Sleeve 80 terminates adjacent to motor block 82 which carries a fixed position axially extending limit pin 84. One end of a tension spring 86 is attached to pin 84 and the opposite end of spring 86 is connected to a limit defining bushing 88 which carries a pair of stop arms 90 disposed at substantially right angles to each other. Arms 90, by contacting pin 84, limit rotation of bushing 88 through an angle of substantially 90 degrees. Bushing 88 is non-rotatably mounted on sleeve 80 by means such as the Allen head set screw 92 shown in FIG. 7. A spacer bushing 94 may also be non-rotatably mounted on sleeve 80 and axially disposed adjacent limit defining bushing 88.

A throttle activated bushing mounted bell crank 95 is rotatably mounted on sleeve 80 axially adjacent spacer 94, as shown in FIG. 6, so that it effectively floats on the sleeve. Bell crank 95 is connected to the throttle lever by means of an apertured arm 98. Arm 98 carries an aperture 100 near the outwardmost end thereof for receiving one end of a connecting rod 102 which has its opposite end connected to the throttle lever (not shown). The other lever arm 96 of bell crank 95 carries a notch 104 at the outermost end thereof for reason to be discussed.

A primary clutch lever arm 108 is non-rotatably mounted on sleeve 80 adjacent bell crank 95. Primary lever arm 108 may be non-rotatably mounted as by Allen head set screw 109. Primary clutch lever arm 108 is provided with an upwardly extending bias spring 110 at its sleeve engaging end. As shown in FIG. 6, spring 110 extends upwardly and rearwardly from the forward end of lever arm 108 and is bent upwardly at an obtuse angle at about the mid portion thereof. Primary lever arm 108 also carries a pivot limit pin 112 extending perpendicular to the side thereof in an axial direction away from bell crank 95 and a stub shaft 114 extending in the same direction.

A secondary clutch lever arm 120 is pivotally mounted on stub shaft 114. Lever arm 120 comprises two legs connected at substantially right angles to each other. The upper leg 121 carries a clutch dog 122. The lower leg 123 carries a pair of indentations 124 located on the upper and lower edges thereof. An activator member 125 is axially disposed adjacent lever arms 108 and 120 on sleeve 80. Activator 125 is rotatably mounted on sleeve 80 and carries two outwardly extending arms. One of the arms carries an annular socket 126 for receiving an activating rod 128. Rod 128 may be connected to the automatic choke as previously discussed or to a push-pull knob on the vehicle dashboard (not shown). The other arm of activator 125 extends in a direction substantially 180 degrees opposite the first arm and carries a lug 130 at the outwardmost end thereof. Lug 130 extends axially toward lever arms 108 and 120 as shown in FIG. 6.

In operation of the mechanism shown in FIGS. 6 and 7, throttle activated bell crank 95 is rotated about sleeve 80 in a clockwise direction (FIG. 7) in conjunction with opening movement of the throttle lever. Normally, spring 110 on primary clutch lever arm 108 biases dog 122 of secondary clutch lever arm 120 into notch 104 on bell crank arm 96 so that rotation of the throttle activated bell crank 95 causes rotation of primary and secondary clutch levers 108 and 120 which are non-rotatably mounted on sleeve 80 and cause rotation thereof. Rotation of sleeve 80 in turn rotates recycle valve shaft 50' which opens the recycle valve as shown in FIG. 5.

When the temperature of the engine is below a predetermined level or poor starting conditions are being experienced connecting rod 128 is moved to the right in the direction of the arrow of FIG. 7, either manually or automatically, causing a clockwise rotation of activator 125.

Lug 130 on activator 125 engages the lower indentation 124 of secondary clutch lever arm 120 rotating arm 120 in a counterclockwise direction against the bias of spring 110 and moving dog 122 out of engagement with notch 104 on bell crank lever arm 96. In this condition rotation of throttle activated bell crank 95 about sleeve 80 does not rotate sleeve 80 or recycle valve shaft 50' so that the recycle valve is not opened. As noted, connecting rod 128 may be operated by either a manual activator or an automatic temperature sensitive activator such as the automatic choke.

Bushing 88 in all cases limits rotation of shaft 50' through substantially a 90 degree angle defined by stop arms 90 on the bushing which move into and out of contact with limit pin 84. Counterclockwise rotation of secondary lever arm 120 is also limited to a position in which dog 122 just clears the outer end of notch 104 by means of limit pin 112 on the primary clutch lever arm 108.

The thermally activated control mechanisms disclosed are exempletive of specific mechanisms which may be used to accomplish the basic objective of preventing recycling of exhaust gases when the temperature of the engine is below a predetermined level. The control mechanism may be activated by a sensor member which senses the temperature of various engine associated components which correspond in temperature to the engine temperature. In addition to the described embodiments, for example, the control mechanism may be activated by sensing the water temperature in the engine cooling system. When such a device is used a water temperature of about 100° F. has been found most appropriate for permitting recycling. When the recycle valve overriding control mechanism is activated by rotation of the choke shaft or in conjunction with the choke thermal control device, it has been found preferable to permit recycling only when the choke is almost all the way open. It has been found that with the thermally responsive control device for recycle systems disclosed it normally takes only about two or three minutes for the engine to arrive at a temperature sufficient to open the recycle valve for recycling exhaust gases through the induction manifold.

Many modifications and variations of the invention, as hereinbefore set forth, may be made without departing from the spirit and scope thereof.

I claim:
1. In an exhaust recycle system for internal combustion engine driven vehicles wherein the engine has a plurality of combustion chambers and exhaust outlets from said combustion chambers; an air-fuel mixer device having a throttle valve; an induction manifold connecting said device to said combustion chambers; means for recycling exhaust gases, said recycling means communicating with said exhaust outlets, and terminating in fluid communication with said induction system whereby exhaust gases are conveyed into said combustion chambers; and exhaust recycle valve means for controlling the quantity of exhaust gases conveyed into said combustion chamber, the improvement comprising drive means for said exhaust recycle valve means, means mechanically interconnected to said exhaust recycle valve means for overriding said drive means when the temperature of said engine is below a predetermined temperature to prevent recycle of exhaust gases until the temperature reaches said predetermined level.

2. A system as defined in claim 1 wherein said overriding means comprises a means for disengaging said drive mechanism from said exhaust recycle valve means when said engine temperature is below said predetermined level.

3. A system as defined in claim 2 wherein said exhaust recycle valve is connected to said throttle valve for conjoint operation therewith and said overriding means comprises a clutch means for effectively disconnecting said throttle valve from said exhaust recycle valve drive mechanism.

4. A system as defined in claim 3 wherein said engine includes a thermally activated automatic choke mechanism and said overriding means is operatively connected to said choke mechanism for activation of said overriding means conjointly with said choke mechanism.

5. An exhaust recycle system as defined in claim 1 further including an accelerator mechanism operatively connected to said throttle valve, said accelerator mechanism having a floorboard position, a part-throttle position, and an idle position, said throttle valve being connected to said accelerator mechanism by means of a first gear means, said first gear means being drivingly connected to a second gear means, said second gear means being connected to said exhaust recycle valve, the ratio of the diameter of said first gear means to the diameter of said second gear means being greater than 1:1 so that said exhaust recycle valve is substantially closed at idle position of said accelerator mechanism, open at part throttle positions of said accelerator mechanism and substantially closed at floorboard position of said accelerator mechanism wherein said overriding means operatively disconnects said second gear means from said recycle valve when the temperature of said engine is below said predetermined temperature.

6. An exhaust recycle system as defined in claim 1 wherein said recycling means comprises a conduit which communicates with the exhaust from said combustion chambers and passes through the interior of said induction manifold for cooling of the exhaust gases and heating of the incoming air-fuel mixture, said conduit terminating in fluid communication with said induction manifold downstream from said air-fuel mixer device.

7. In an exhaust recycle system for an internal combustion engine driven vehicle wherein the engine has a plurality of combustion chambers and valved exhaust outlets from said combustion chambers, an air-fuel mixer device having a throttle valve, an induction manifold connecting said device to said combustion chambers, and valved means for recycling exhaust gases from said valved exhaust outlets into said induction manifold, the improvement comprising means for limiting the operation of said exhaust recycle means to temperatures above a predetermined temperature of said engine, drive means for said recycle valve, said means for limiting the operation of said valved exhaust recycle means comprising a clutch mechanism for rendering said means inoperative when the temperature of said engine is above said predetermined temperature.

8. An exhaust recycle system as defined in claim 7 wherein said recycle means comprises a valve member mounted on a recycle valve control shaft and said clutch mechanism includes an activating lever rotatably mounted on said recycle valve control shaft, a throttle connected arm rotatably mounted on said recycle valve control shaft and a clutch dog non-rotatably mounted on said recycle valve control shaft intermediate said activating lever and said arm for engaging said arm and operatively connecting said recycle valve control shaft to said arm when the temperature of said engine is above said predetermined temperature.

References Cited
UNITED STATES PATENTS

| | | |
|---|---|---|
| 1,916,325 | 7/1933 | McAdams. |
| 2,287,593 | 6/1942 | Ball _____ 123—122 |
| 2,421,406 | 6/1947 | Bicknell. |
| 3,135,253 | 6/1964 | Muhlberg. |
| 3,237,615 | 3/1966 | Daigh. |

AL LAWRENCE SMITH, Primary Examiner

U.S. Cl. X.R.

123—122